Feb. 10, 1953     A. E. MAYER     2,627,840
MILKING MACHINE
Filed April 20, 1951
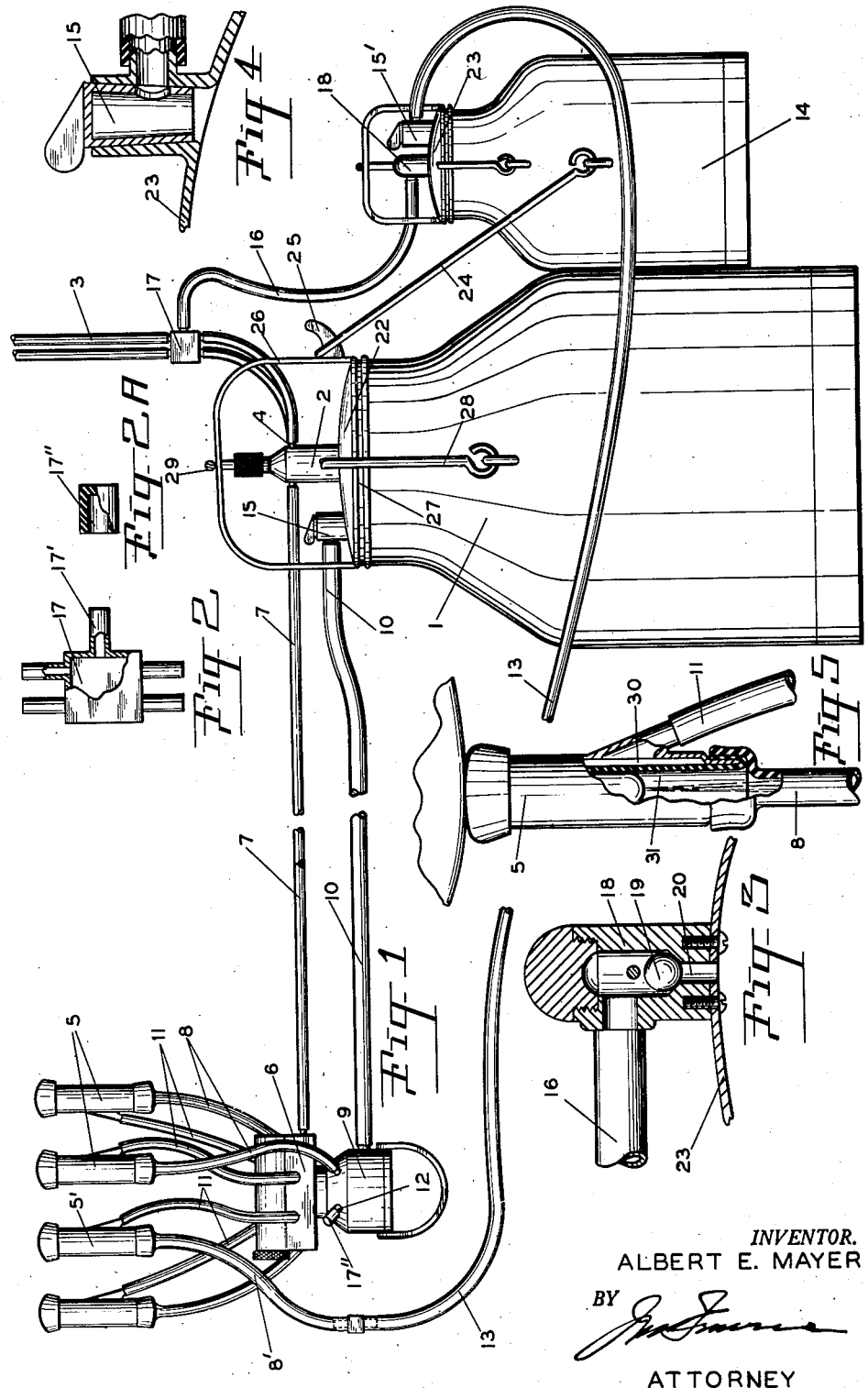
INVENTOR.
ALBERT E. MAYER
BY 
ATTORNEY Patented Feb. 10, 1953

2,627,840

UNITED STATES PATENT OFFICE 2,627,840

MILKING MACHINE

Albert E. Mayer, Bay City, Oreg.

Application April 20, 1951, Serial No. 222,008

2 Claims. (Cl. 119—14.01)

This invention relates to improvements in milking machines. The primary object of the invention is to by-pass infected milk from infected quarters or cistern of the cow's udder into a separate receiver.

A further object of the invention is to milk all quarters of the udder at the same time that the separation is being effected. Due to the nature of the cow in letting down her milk, it is vitally important that all quarters of the udder be milked at the same time, especially the infected milk should be removed without causing the cow to hold up by any unusual milking operation.

Heretofore penicillin or other medicine has been used to kill the bacteria of infected quarters, but it has been found that penicillin interferes and reduces the quality of the milk, especially in regards to cheese making, therefore with my new and improved method of separating the infected milk the penicillin treatment can be carried on effectively clearing up the disease after which the use of my separator can be dispensed with.

These and other incidental objects will be apparent in the drawings, specification and claims.

Referring to the drawings:

Figure 1 illustrates a conventional milking machine receiver and teat cups assembled together and having my new and improved auxiliary receiver combination.

Figure 2 illustrates an adapting unit for tapping the vacuum supply line with my auxiliary receiver vacuum line.

Figure 2A is a broken away view of the cap for sealing the adapter shown in Figure 2 when the auxiliary vacuum line is removed.

Figure 3 is an enlarged sectional fragmentary view of the check valve used in connection with the auxiliary vacuum line.

Figure 4 is an enlarged fragmentary sectional view of the shut off valve in connection with the auxiliary milk line.

Figure 5 is a broken away view of a conventional teat cup illustrating that the pulsating vacuum chamber and the milk receiving chambers are completely separated in their action.

Referring more specifically to the drawings:

The standard milk receiver container is indicated by numeral 1, having the usual check valve head 2 to which the main vacuum supply line 3 is connected at 4. The vacuum supply line 3 is usually a twin hose line, the object of which is to control the pulsating action necessary in the operating of the teat cups 5, which are connected to the pulsating unit 6, which in turn is connected to the check valve head 2 by way of the double tubing 7. The parts described are of well known construction in the type of milking machine conventionally illustrated and form no part of the present invention except it illustrates the application of the novel features to be hereinafter described. Obviously, the invention is applicable to other types of milking machines employing single in lieu of dual hose lines 3 and 7.

Hose lines 8 connect to the manifold or receiver 9 of the pulsator 6. The check valve head 2 creates a vacuum within the receiver 1 which draws the milk from the receiver 9 of the pulsator by way of the hose line 10. The vacuum within the tube line 7 and the pulsator 6 is connected to the teat cups by way of the hose lines 11 and is entirely independent from the hose lines 8 and the lower part of the manifold or receiver 9, including the receiver 1.

In using my method of separating infected milk from different quarters of the udder, the pulsating action within the teat cups remains the same, but I remove one of the hose lines 8' from the nipple 12 leading into the manifold 9 of the pulsator and connect the same to an auxiliary milk tube 13 leading into an auxiliary receiver 14 entering the receiver by way of the shut off valve 15' the latter valve being employed to shut off the vacuum in tube 13 to maintain vacuum in receiver 14 when teat cup 5' is disconnected.

An auxiliary vacuum line 16 is connected to the main vacuum line 3 by way of the adapter 17 and connected to the auxiliary tank 14 by way of the check valve head 18, which is shown detailed in Figure 3, this vacuum line pulls a vacuum in the milk tube 13. In the valve 18 is a check valve 19 to control the passage 20 in the lid 23 leading to the receiver 14. When the hose line 16 is connected with the line 3 through the adapter 17, the vacuum raises the valve 19 to supply vacuum to the receiver 14. When the hose line 16 is disconnected from the adapter, vacuum in receiver 14 closes the said valve and therefore vacuum is maintained in said receiver.

In operation the teat cups 5 and 5' are connected to the teats of the cow's udder and the milk is removed from the udder into the main receiver in the usual manner through the hose lines 2, by the action of the vacuum operating the teat cups from the pulsator 6, the vacuum within the receiver 1 pulling the milk from the said teat cups by way of the hose lines 8 through the manifold 9 of the pulsator vacuum milk tube 10 into the receiver. At the same time the milk is being removed from the infected quarter of the udder by way of the teat cup 5', hose line 8', auxiliary hose line 13 into the receiver 14 by way of the vacuum line 16 creating a vacuum within the receiver 14 in order to draw the infected milk therein.

By referring to Figure 5 it can be understood how the pulsating or operating vacuum is completely separated from the milk receiving vacuum tubes leading into the receiver, therefore by simply connecting my auxiliary receiver to one of the hose lines 8 directly, this infected milk is brought into the auxiliary receiver without any connection whatever to the milk going into the main receiver, and due to the fact that the vacuum line 16 is connected beyond the main receiver 1 in the vacuum supply line, none of the germs entering the auxiliary receiver is brought into contact with the main receiver.

I have found that it is best to exchange one of the teat cups 5 for an entirely different teat cup 5', also the tube 8 for the tube 8', so that no germs can be transmitted from one cow to another. In order to disconnect my auxiliary receiver the vacuum lines 3 are shut off in the usual manner. The valves 15 and 15' are closed after which the teat cups 5 and 5' are removed from the teats of the cow. In order to drain the milk from the cups 5 and 5' the valves 15 and 15' are opened. This drains the tube 10 and the tube 13 of any surplus milk therein both into the main receiver 1 and the auxiliary receiver 14, there being enough vacuum remaining in the receivers to accomplish this result.

The construction of the lids 22 and 23 of the receivers are of a conventional construction. The auxiliary receiver may be connected to the main receiver 1 by way of the bail 24 hooking over the hook 25 of the handle 26 of the lid 22, the lid being held down against the gasket 27 by the usual bale 28 being slipped over the handle 26 at 29. The same construction is carried out on my auxiliary receiver 14, although I do not wish to be limited to the exact mechanical structure of the receivers, as other makes of milking receivers are readily adapted to my invention which differ somewhat mechanically.

When my auxiliary receiver is added for receiving infected milk from the quarter, the vacuum tubing 16 is applied to the nipple 17' of the adapter 17 after the closure cap 17" is removed from the nipple. This cap then is applied to the nipple 12 of the manifold 9 after the teat tube has been removed therefrom, or vice versa.

In Figure 5 the pulsating vacuum chamber is indicated at 30, which is in direct communication with the pulsator 6 by way of the tube 11. The milk receiving chamber within the teat cup is indicated by numeral 31 and is connected to the manifold 9 by way of the milk tube 8. I merely bring this detail out to illustrate that the pulsating vacuum connection can remain the same without alteration, due to the fact that it does not communiacte with the milk line, thereby making it a simple matter to separate the milk from the infected quarter by exchanging the teat cup 5 for the teat cup 5', hose 8' for the hose 8, connecting the same to the auxiliary milk line 13 and supplying the vacuum within the auxiliary receiver by way of the vacuum hose line 16 connected to the fitting beyond the main receiver.

What I claim is:

1. A milking machine comprising a main milk receiver having a lid with a check valve, a vacuum line connected to the valve, a pulsator unit including a pulsator and a manifold, teat cups having separated milk receiving and vacuum chambers, tubing connecting the pulsator to the check valve, nipples on the manifold, hose lines connecting the milk receiving chambers of some of the teat cups to the nipples, hose lines connecting the vacuum chambers of the teat cups to the pulsator, a shut-off valve on the lid, a hose line connecting the manifold to the main milk receiver through the shut-off valve, in combination with means for discharging and separately collecting infected milk from infected quarters of a cow's udder, comprising an auxiliary milk receiver having a lid with a check valve, a shut-off valve on the lid of the auxiliary milk receiver, an auxiliary milk tube for connecting a hose line from the milk receiving chamber of other of said teat cups on a teat of an infected udder quarter to the auxiliary milk receiver through the latter shut-off valve upon disconnecting said hose line from a nipple, a closure cup for the latter nipple, an adaptor interposed in the vacuum line having a nipple, and a vacuum hose line connecting the latter nipple to the auxiliary milk receiver through the check valve on the lid thereof to create suction in the auxiliary milk receiver to draw infected milk from the infected udder quarter through the hose line, from the milk receiving chamber of the teat cup thereon and the auxiliary milk tube directly to the auxiliary milk receiver.

2. A milking machine, comprising a pulsating unit including a manifold, means for supplying vacuum to the pulsator unit including a pipe connected with said pulsator unit, a group of teat cups, tubes connecting the group of teat cups to the pulsator unit to supply vacuum thereto, tubes connecting the teat cups to the manifold for collecting the milk, a separate teat cup, a tube connecting the separate teat cup to the pulsator to supply vacuum thereto, a separate tube connected to the separate teat cup, a milk receiver having a valve, a tube connecting the manifold with the valve, an auxiliary milk receiver having a valve, the separate tube connected to the separate test cup communicating with the valve on the auxiliary milk receiver, a check valve on the auxiliary milk receiver, a tube communicating with the check valve and the vacuum supply pipe, whereby substantially pure milk can be delivered to the main milk receiver from selected cow's udder quarters and simultaneously infected milk can be drawn from an infected cow's udder quarter and delivered to the auxiliary milk receiver.

ALBERT E. MAYER.

REFERENCES CITED

The following references are of record in the file of this patent:

UNITED STATES PATENTS

| Number | Name | Date |
|---|---|---|
| 1,197,717 | Disbrow | Sept. 12, 1916 |
| 1,206,096 | Dinesen | Nov. 28, 1916 |
| 1,296,166 | Dalzell | Mar. 4, 1919 |
| 1,394,433 | Leitch | Oct. 18, 1921 |
| 1,603,429 | Uphaus et al. | Oct. 19, 1926 |
| 2,445,904 | Bloemers | July 27, 1948 |